(12) United States Patent
Kumamoto et al.

(10) Patent No.: US 8,221,911 B2
(45) Date of Patent: Jul. 17, 2012

(54) METHOD FOR OPERATING REDOX FLOW BATTERY AND REDOX FLOW BATTERY CELL STACK

(75) Inventors: Takahiro Kumamoto, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 604 days.

(21) Appl. No.: 12/390,802

(22) Filed: Feb. 23, 2009

(65) Prior Publication Data

US 2009/0197151 A1    Aug. 6, 2009

Related U.S. Application Data

(62) Division of application No. 10/512,155, filed as application No. PCT/JP2003/005060 on Apr. 21, 2003, now abandoned.

(30) Foreign Application Priority Data

Apr. 23, 2002   (JP) ................. 2002-120165

(51) Int. Cl.
    *H01M 2/38* (2006.01)
(52) U.S. Cl. ........................................... 429/51
(58) Field of Classification Search ............. 429/51
    See application file for complete search history.

(56) References Cited

FOREIGN PATENT DOCUMENTS

| JP | 61-193375 | | 8/1986 |
|----|-----------|---|--------|
| JP | 63-16574 | | 1/1988 |
| JP | 63016574 | A * | 1/1988 |
| JP | 5-326007 | | 12/1993 |
| JP | 05326007 | A * | 12/1993 |
| JP | 2000-260460 | | 9/2000 |
| WO | WO 90/03666 | | 4/1990 |
| WO | WO 99/39397 | | 8/1999 |
| WO | WO 02/15317 | A1 | 2/2002 |

OTHER PUBLICATIONS

Japanese Office Action issued in corresponding Japanese Patent Application No. JP 2002-120165, dated Dec. 26, 2006.
European Search Report issued in European Patent Application No. EP 03 71 7670, mailed Sep. 7, 2007.

* cited by examiner

*Primary Examiner* — Karie O'Neill Apicella
(74) *Attorney, Agent, or Firm* — McDermott Will & Emery LLP

(57) ABSTRACT

The invention provides an operating method of a redox flow battery capable of grasping a charging state of the battery more reliably to stabilize an output capacity of the battery. The method is for operating the redox flow battery comprising a cell stack 1 comprising a plurality of cells. A selected cell(s) in the cell stack 1, to and from which positive electrode electrolyte and negative electrode electrolyte are supplied and discharged and which is/are not normally connected to a DC/AC converter 225, is/are in the form of an auxiliary cell 2 used for measuring a charging rate of the electrolyte. Also, a stop of charge of a main cell 3 and a stop of discharge of the main cell 3 are controlled with reference to a circuit voltage obtained from the auxiliary cell 2. Since the auxiliary cell 2 is integrally incorporated in the cell stack 1, the charging state of the battery can be grasped reliably without stopping the charge/discharge operation of the main cell 3. Also, since the stop of charge of the main cell 3 and the stop of discharge of the same are controlled with reference to the measured circuit voltage, the output capacity can be stabilized.

7 Claims, 3 Drawing Sheets

METHOD FOR OPERATING REDOX FLOW BATTERY AND REDOX FLOW BATTERY CELL STACK

RELATED APPLICATIONS

This application is a Divisional of U.S. application Ser. No. 10/512,155, filed Oct. 22, 2004 now abandoned, which is a U.S. National Phase under 35 U.S.C. §371 of International Application No. PCT/JP2003/005060, filed on Apr. 21, 2003, claiming priority of Japanese Application No. 2002-120165, filed on Apr. 23, 2002, the entire contents of each of which are hereby incorporated by reference.

TECHNICAL FIELD

The present invention relates to an operating method of a redox flow battery and to a cell stack of the same. More particularly, the present invention relates to an operating method of a redox flow battery capable of constantly grasping the state of charge to stabilize an output capacity most suitably, and to a cell stack of the redox flow battery most suitable for this operating method.

BACKGROUND ART

In general, redox flow batteries are used for load leveling or for countermeasure to voltage sag (momentary drop in voltage). FIG. 3 shows an explanatory view showing an operating principle of a redox flow secondary battery. This battery has a cell 100 which is separated into a positive electrode cell 100A and a negative electrode cell 100B by a membrane 103 of an ion-exchange membrane. A positive electrode 104 and a negative electrode 105 are contained in the positive electrode cell 100A and the negative electrode cell 100B, respectively. A positive electrode tank 101 for feeding and discharging positive electrode electrolyte to and from the positive electrode cell 100A is connected to the positive electrode cell 100A through conduit pipes 106, 107. Similarly, a negative electrode tank 102 for feeding and discharging negative electrode electrolyte to and from the negative electrode cell 100B is connected to the negative electrode cell 100B through conduit pipes 109, 110. Aqueous solution containing ions that change in valence, such as vanadium ion, is used for the respective electrolytes and is circulated by using pumps 108, 111, to charge or discharge with an ionic valence change reaction on the positive and negative electrodes 104, 105. For example, when the electrolyte containing the vanadium ions is used, the following reactions occur in the cell during the charge or discharge of electricity:

Positive electrode: $V^{4+} \rightarrow V^{5+} + e^-$ (Charge) $V^{4+} \leftarrow V^{5+} + e^-$ (Discharge)

Negative electrode: $V^{3+} + e^- \rightarrow V^{2+}$ (Charge) $V^{3+} + e^- \leftarrow V^{2+}$ (Discharge)

FIG. 4 is a schematic block diagram of a cell stack used for the battery. A structure comprising a plurality of sub-stacks 201 stacked in layers, each comprising a plurality of cells stacked in layers, what is called a cell stack 200, is used for battery described above. Each cell has the positive electrode 104 made of carbon felt and the negative electrode 105 made of carbon felt which are arranged at both sides of the membrane 103. Cell frames 210 are arranged at the outside of the positive electrode 104 and at the outside of the negative electrode 105, respectively. Each cell frame 210 comprises a bipolar plate 211 made of a plastic carbon and a frame 212 surrounding the bipolar plate.

The frame 212 has a plurality of holes, which are called manifolds, formed therein. Each cell frame has e.g. eight manifolds in total, four in a lower side thereof and four in an upper side thereof. Two of the four manifolds in the lower side of the cell frame are used for supplying positive electrode electrolyte, and the remaining two are used for supplying negative electrode electrolyte. Two of the four manifolds in the upper side of the cell frame are used for discharging the positive electrode electrolyte, and the remaining two are used for discharging the negative electrode electrolyte. The manifolds are formed into flow channels for the electrolytes to pass through by stacking a number of cells in layers and in turn are connected to circuit pipes 106, 107, 109, 110 in FIG. 3. The electrolytes are supplied and discharged in each of the sub-stacks 201. As shown in FIG. 2, electrolyte supplying pipes 220, 221 for supplying the positive electrode electrolyte and the negative electrode electrolyte and electrolyte discharging pipes 222, 223 for discharging the positive electrode electrolyte and the negative electrode electrolyte are connected to each of the sub-stacks 201.

The sub-stacks 201 are electrically interconnected through conductive plates 224, such as copper plates, interposed between adjacent sub-stacks. Each sub-stack 201 has electrical terminals (not shown) provided on a side thereof different from the sides on which the electrolyte supplying pipes 220, 221 and the electrolyte discharging pipes 222, 223 are provided. The entirety of the cell stack 200 is usually connected to a DC/AC converter 225 through the electrical terminals.

For the load leveling, this redox flow battery is commonly operated to stop charging and discharging based on an upper limit and a lower limit of a predetermined distribution voltage. The stop of charging and the stop of discharging are both determined with reference to the distribution voltage (a voltage of the cell when the battery is in operation). Also, the charging state (charging rate) of the electrolyte in the cell is commonly grasped with reference to a circuit voltage (a voltage of the cell when the battery is in non-operation).

The conventional redox flow battery has the following problems, however.

(1) When the stop of charging and discharging is determined with reference to the distribution voltage, variations in charging rate of the cell may be caused.

Operating conditions of the battery vary depending on changes in battery resistance caused by degradation of the battery, variation in the environment, such as temperature variation, and the like. For example, generally speaking, the higher the temperature is, the more effectively the battery can charge and discharge. When the stop of charging and the stop of discharging are determined with reference to the distribution voltage, the variations in operating condition may cause variations in charging rate of the cell, i.e., variations in output capacity of the cell (kWh), at the stop of charging and discharging.

(2) It is difficult for the conventional redox flow battery to constantly grasp the charging rate of the cell.

Measurement of the circuit voltage requires the halt of the operation of the battery. Consequently, trying to grasp the charging state (charging rate) of the cell constantly with reference to the circuit voltage as usual requires the continuous halt of the operation of the battery. Hence, this is not a realistic way. As is known in recent years, the redox flow battery is often combined with a wind power generation system or a solar power generation system, to provide a stabilized output capacity. In this combination, the charging rate of the cell cannot be changed properly without grasping the charging rate of the electrolytic and, as a result, the battery may fail to charge and discharge electricity sufficiently. Accordingly, grasping the charging rate of the cell constantly is being desired.

It is a primary object of the invention to provide an operating method of a redox flow battery capable of grasping a charging rate of the battery further reliably to stabilize an output capacity of the battery, and provide a cell stack optimum for this operating method.

DISCLOSURE OF THE INVENTION

The present invention accomplishes the above-said object by provision of an auxiliary cell, integrally incorporated in a cell stack, for monitoring a circuit voltage.

The present invention is directed to an operating method of a redox flow battery comprising a cell stack comprising a plurality of cells. At least a part of the cells in the cell stack to and from which positive electrode electrolyte and negative electrode electrolyte are supplied and discharged and which is not normally connected to a DC/AC converter is in the form of an auxiliary cell used for measuring a charging rate of the electrolyte. Also, at least either of a stop of charge of the battery and a stop of discharge of the battery is controlled in accordance to a circuit voltage obtained from the auxiliary cell.

In the present invention, a selected cell(s) of the cells in the cell stack which are constructed to share the electrolyte with each other is/are in the form of an auxiliary cell used for measuring a charging rate. This auxiliary cell serves as a cell which does not normally charge and discharge, but works to simply put the electrolyte in circulation through the cell stack. The remaining cells serve as the cells (main cell) used for charging and discharging electricity. The stop of charge of the main cell and the stop of discharge of the main cell can be made when the circuit voltage measured from the auxiliary cell reaches a certain value. The provision of this auxiliary cell enables the circuit voltage to be monitored and measured substantially constantly without any need to stop the charge/discharge operation of the battery as usual. When the circuit voltage measured is used for signals to stop charging and signals to stop discharging, the battery can be used in substantially the same charging state, thus ensuring the stabilized output capacity of the battery.

It may be conceivable that in the conventional redox flow battery, a cell stack designed specifically for monitoring is added to the cell stack for charging and discharging electricity. However, the addition of the cell stack designed specifically for monitoring results in enlargement of the equipment and leads to cost increase. In contrast to this, in the present invention, since a part of the cell stack for charging and discharging electricity is in the form of the auxiliary cell of a unitary construction, no special equipment is needed for the monitoring, providing not only the advantage in productivity but also reduction in scale of the equipment and in cost.

Also, the present invention provides an operating method wherein at least a part of the cells in the cell stack which is not normally connected to a DC/AC converter is in the form of an auxiliary cell, as is the case with the above, and the auxiliary cell is charged or discharged in accordance to the circuit voltage obtained from the auxiliary cell, to change a charging rate of the electrolyte.

In the invention as previously mentioned, the stop of charge of the main cell and the stop of discharge of the main cell are controlled with reference to the circuit voltage measured from the auxiliary cell, and the auxiliary cell is solely used for measuring the circuit voltage substantially constantly. In contrast to this, in this invention, when the circuit voltage measured from the auxiliary cell is in a constant level, the auxiliary cell is brought to a halt to monitoring and is temporally used for charging and discharging electricity, in addition to being used for measuring the circuit voltage. This operating method is optimum for combination of the redox flow battery with a wind generation system or a solar photovoltaic system and also is optimum for any battery operation that may provide an unstable output capacity, including a demand control. In this operating method, the charging rate of the main cell which is usually operated to recharge and discharge can be surely grasped by the auxiliary cell. In addition to this, even when the charging rate of the main cell is decreased or increased excessively, the main cell can be allowed to charge and discharge continuously by putting the auxiliary cell into operation to charge and discharge. This can produce a stabilized output capacity.

For charging and discharging the auxiliary cell, a power source can be additionally attached to the auxiliary cell.

For this operating method of the present invention, the following cell stack is preferably used. The present invention provides a cell stack of a redox flow battery comprising a plurality of cells, the cell stack including the combination of a main cell and an auxiliary cell being integrally combined with each other as given below:

The main cell to and from which positive electrode electrolyte and negative electrode electrolyte are supplied and discharged and which is connected to a DC/AC converter; and The auxiliary cell for measuring a charging rate of the electrolyte, which is connected to the main cell in such a manner as to share the electrolytes with the main cell and is not normally connected to the DC/AC converter.

The auxiliary cell can be formed to have the same construction as the sub-stack forming the main cell and can be formed by stacking a plurality of cells in layers. A smaller number of auxiliary cell than the number of cells forming the sub-stack is preferably used in that reduction in scale of facilities as well as in cost can be achieved.

BEST MODE FOR CARRYING OUT THE INVENTION

In the following, an embodiment of the present invention will be explained.

Test Example 1

Figure 1:
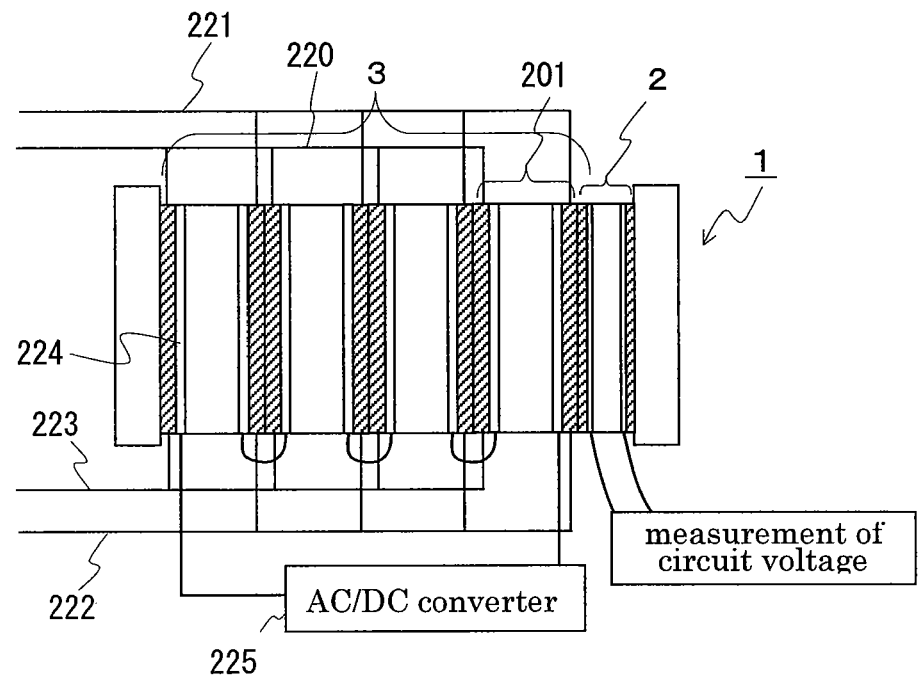
FIG. 1 is a diagrammatic illustration of a cell stack of the present invention.
Figure 2:
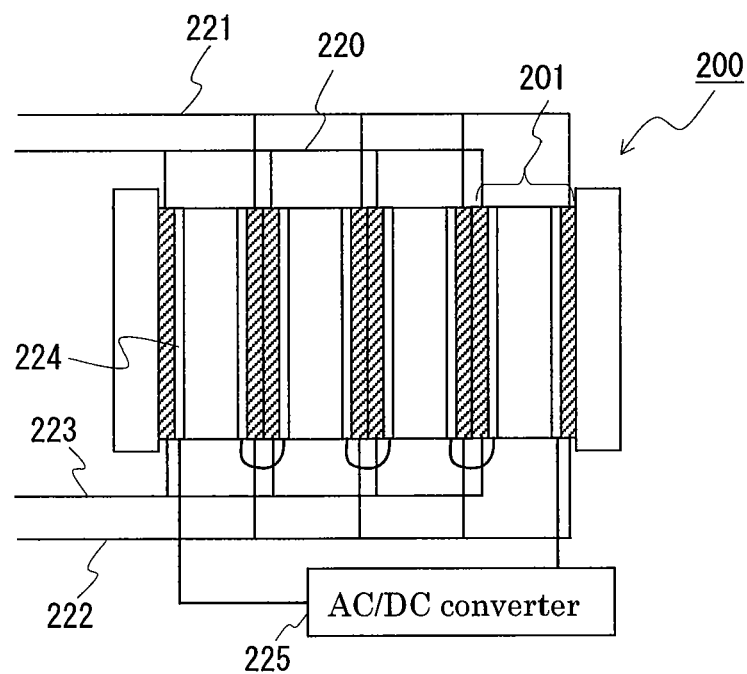
FIG. 2 is a diagrammatic illustration of a conventional cell stack.
Figure 3:
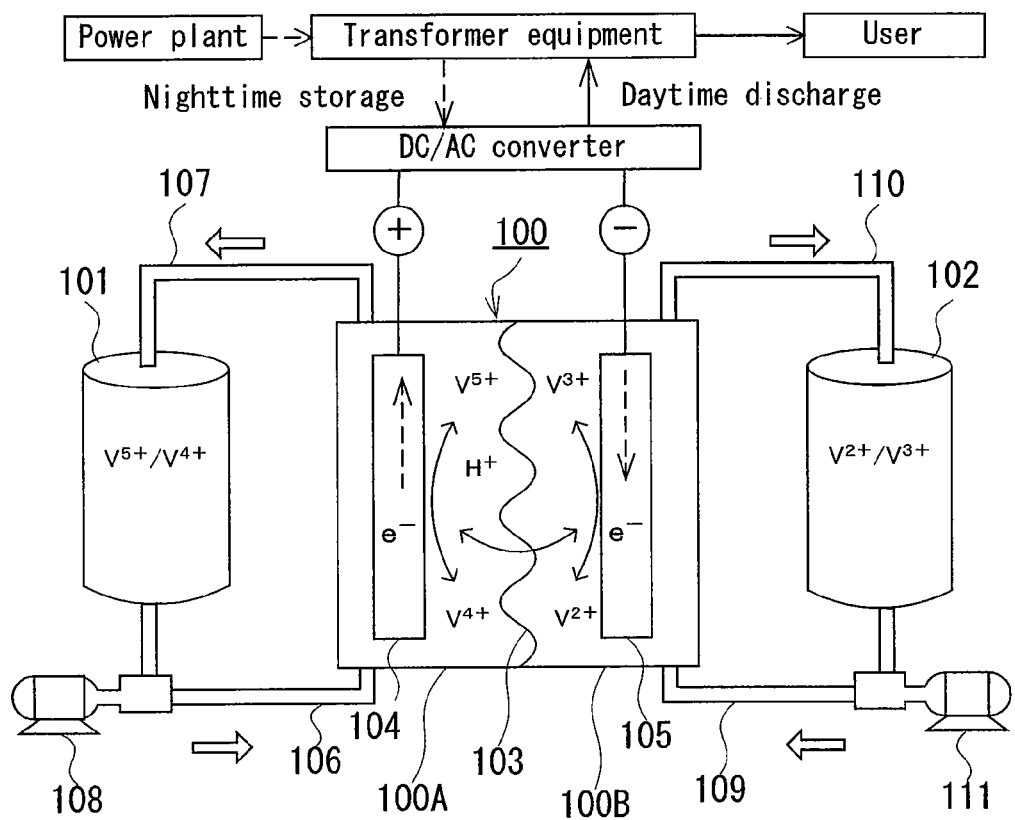
FIG. 3 is an explanatory view of an operating principle of the redox flow battery.
Figure 4:
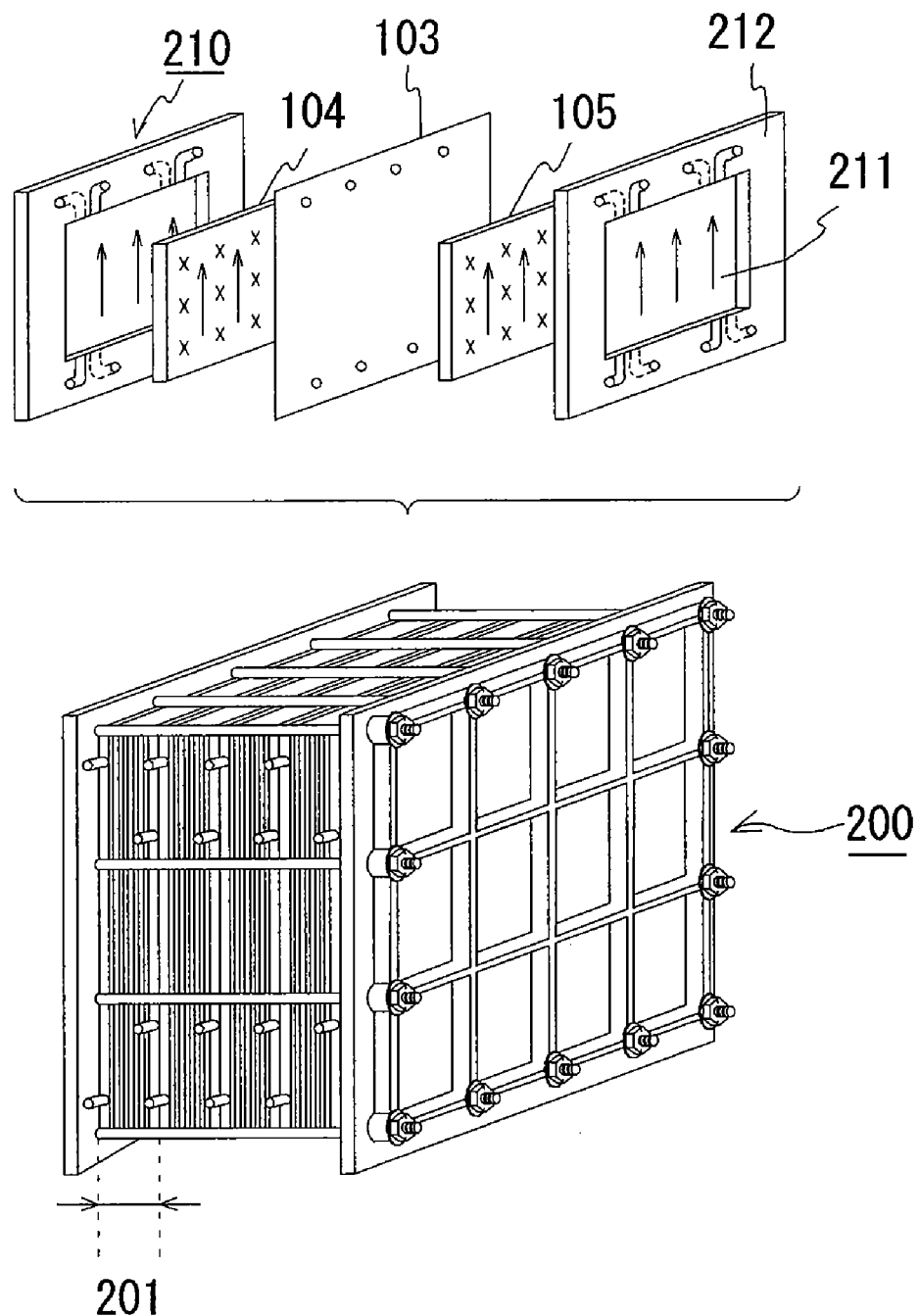
FIG. 4 is a diagrammatic illustration of the construction of the cell stack used for the redox flow battery.

A redox flow battery of AC170 kW×8 hrs. was produced and the changes of the battery capacity with variation of temperature was monitored. For the test, the redox flow battery system as shown in FIGS. 3 and 4 was fabricated. Taken as the test sample No. 1-1 was a redox flow battery using the cell stack 1 comprising a total of five sets of cells, namely, four sets of sub-stacks 201 (main cell 3), each comprising twenty-five cells stacked in layers, not shown, and one set of auxiliary cell 2 comprising the same cell 1, as shown in FIG. 1. Taken as the test sample No. 1-2 was a redox flow battery using the cell stack 200 comprising four sets of sub-stacks 201 and having no auxiliary cell (the cell stack comprising the main cell only), as shown in FIG. 2. The operating conditions for the test are shown below. The test results are shown in TABLE 1.

Test Sample No. 1-1: The circuit voltage is constantly measured by the auxiliary cell so that the stop of charge of the main cell and the stop of discharge of the same are controlled with reference to the circuit voltage as constantly measured by the auxiliary cell. The battery is recharged till a circuit voltage of 1.46V/cell and is discharged till a circuit voltage of 1.33V/cell.

Test Sample No. 1-2: The distribution voltage is constantly measured so that the stop of charge of the main cell and the stop of discharge of the same are controlled with reference to the distribution voltage. The battery is operated with a charging voltage of 1.55V/cell and a discharging voltage of 1V/cell.

TABLE 1

| Temperature | Test Sample No. 1-1 | Test Sample No. 1-2 |
| --- | --- | --- |
| 25° C. | 8 hours | 6.4 hours |
| 35° C. | 8 hours | 8 hours |

As shown in TABLE 1, both of the test samples exhibited a rated discharging output capacity of 8 hours at a relatively high temperature of 35° C. However, the test sample No. 1-2 wherein the stop of charge and discharge of the main cell was controlled with reference to the distribution voltage exhibited only a capacity lower than the rated discharging output capacity at a relatively low temperature of 25° C. In contrast to this, the test sample No. 1-1 wherein the stop of charge and discharge of the main cell was controlled with reference to the circuit voltage exhibited the rated discharging output capacity of 8 hours at the relatively low temperature of 25° C.

It can be seen from the test results that the method of the present invention wherein the circuit voltage is measured by the auxiliary cell, so that the stop of charge of the main cell and the stop of discharge of the same is controlled with reference to the circuit voltage as measured by the auxiliary cell can provide a stabilized output capacity of free of influence from the temperature and the like. In addition, since the auxiliary cell is integrally combined with the cell stack, for the measurement of the circuit voltage, the circuit voltage can be measured by the auxiliary cell without any need to stop the charge/discharge operation of the main cell.

Test Example 2

A redox flow battery of AC170 kW×6 hrs. was produced. When the charging rate of the main cell decreased, the auxiliary cell was charged. The basic configuration of the battery used in this example was the same as that of the redox flow battery taken as the test sample No. 1-1 used in the Test Example 1. The test was carried out in the following manner. When the circuit voltage as measured by the auxiliary cell reached 1.35V/cell, a direct-current power source additionally provided on the auxiliary cell was turned on to start the charging and discharging operation of the auxiliary cell.

It was found from the test results that when about 100 kWh was charged by the auxiliary cell in a constant current operation, the decreased charging rate of the main cell could be increased by the auxiliary cell, so that the main cell could keep on discharging to an extent corresponding to the electricity charged by the auxiliary cell. Then, the output capacity was nearly 6.5 hours. For comparison, the auxiliary cell was not charged even when the circuit voltage reached 1.35V/cell. In this case, the output capacity was 6 hours, coming to the end of the discharge of electricity.

It can be seen from the test results that the auxiliary cell can be used not only for measuring the circuit voltage constantly, but also for additionally supporting the charge of the main cell, as occasion demands. The application of the auxiliary cell to the charge of electricity can produce an increased output capacity.

Test Example 3

Combination of the redox flow battery (AC170 kW×6 hrs.) produced in Test Example 2 with a wind generator was produced. When reduction occurred in charging rate of the main cell, a total output of the wind generator plus the redox flow battery was decreased. This test was carried out in the following manner. When the circuit voltage as measured by the auxiliary cell reached 1.37V/cell, the total output was decreased and the operation was continued until the circuit voltage reached 1.35V/cell. The specification of the wind generator used is given below.

(Specification of Wind Generator)
Type: Dielectric generator
Rated output: 275 kW
Rated voltage: 400V
Rated speed: 1,500 rpm It was found from the test results that the charging rate of the main cell could be increased by decreasing the total output, whereby the main cell could keep on discharging. Then, the output capacity was nearly 1,120 kWh. For comparison, the total output was not decreased even when the circuit voltage reached 1.37V/cell. In this case, the output capacity was 1,020 kWh.

In Examples 2 and 3, the ways of increasing the charging rate of the main cell were examined. When the charging rate of the main cell increased so excessively that the main cell could not charge any more, the charging rate of the main cell could be reduced by using the above-mentioned ways in reverse, such as, for example, discharging electricity from the auxiliary cell or increasing the total output.

Capabilities of Exploitation in Industry

As mentioned above, in the cell stack of the redox flow battery of the present invention, since the auxiliary cell is integrally combined with the cell stack, there can be provided the advantageous result that the circuit voltage can be measured substantially constantly by the auxiliary cell, without stopping the charge/discharge operation of the main cell. Also, in the operating method of the present invention, since the stop of charge of the main cell and the stop of discharge of the same are controlled with reference to the circuit voltage obtained by the measurement, the output capacity can be stabilized further. Hence, the operating method of the present invention can realize the stabilization of the output capacity even in an irregular operation, such as a power generation by wind and a demand control.

The invention claimed is:
1. An operating method of a redox flow battery comprising a cell stack comprising a plurality of cells, wherein
    a cell in the cell stack, to and from which positive electrode electrolyte and negative electrode electrolyte are supplied and discharged and which is connected to a DC/AC converter, is in the form of a main cell, and
    a remaining cell in the cell stack, which is constituted in such a manner as to share the electrolytes with the main cell and which is not connected to the DC/AC converter, is in the form of an auxiliary cell, the operating method comprising the steps of:

measuring a circuit voltage of the auxiliary cell without a stop of charge/discharge operation of the main cell, and controlling at least either of a stop of charge of the main cell and a stop of discharge of the main cell with reference to the circuit voltage of the auxiliary cell.

2. The operating method of the redox flow battery according to claim 1, wherein the auxiliary cell is temporally connected to the DC/AC converter and charged or discharged with reference to the circuit voltage of the auxiliary cell to change a charging rate of the electrolyte.

3. The operating method of the redox flow battery according to claim 2, wherein the auxiliary cell is charged by an additional power source.

4. The operating method of the redox flow battery according to claim 1, wherein the auxiliary cell and the main cell have an identical structure.

5. The operating method of the redox flow battery according to claim 2, wherein the auxiliary cell and the main cell have an identical structure.

6. The operating method of the redox flow battery according to claim 3, wherein the auxiliary cell and the main cell have an identical structure.

7. The operating method of the redox flow battery according to claim 1, wherein the electrolytes are supplied to the auxiliary cell in parallel with the main cell.

* * * * *